March 18, 1952 — T. M. JABLON — 2,589,260
KEY CHAIN
Filed April 26, 1947
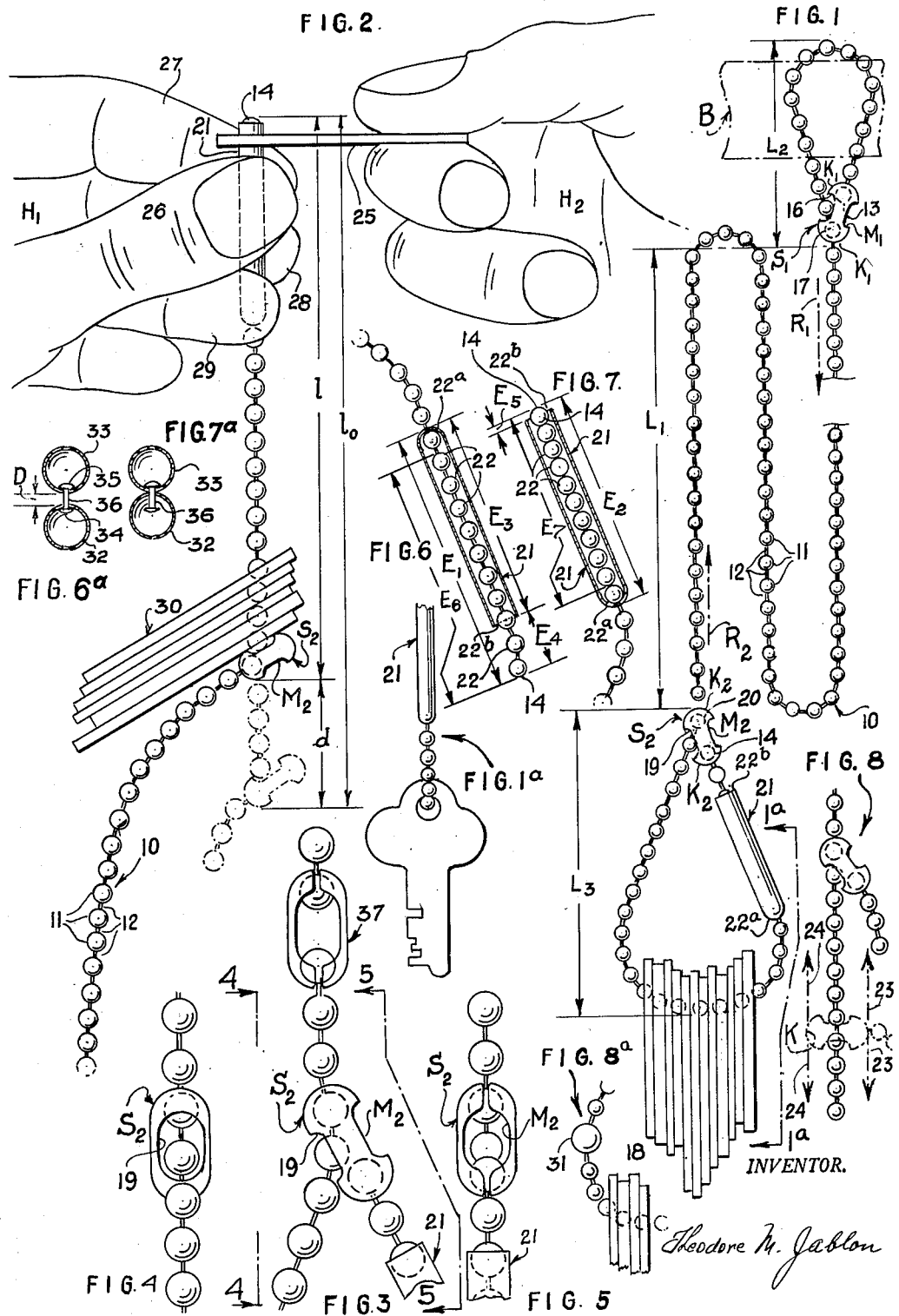
INVENTOR.
Theodore M. Jablon Patented Mar. 18, 1952

2,589,260

UNITED STATES PATENT OFFICE 2,589,260

KEY CHAIN

Theodore M. Jablon, New York, N. Y.

Application April 26, 1947, Serial No. 744,092

10 Claims. (Cl. 70—457)

This invention relates to key chains in which a key holding portion has an anchoring chain attached to a person's wearing apparel; as well as to keyholding loops or key rings comprising chain portions, per se.

One of the objects is to provide a key ring or chain which facilitates and expedites the attaching and detaching of the keys; a key chain which is simple, strong, secure, non-twisting, inexpensive, and which produces a minimum of bulging of the keys, as well as their convenient and unhampered removal from a wearer's pocket; a key chain which is adjustable as to length, and which is readily attachable to the user's wearing apparel.

In order to attain some of these objects I provide a key holding chain at one end with a hollow or tubular key threading member and at the other end with a coupling member. The threading member in turn I provide with a flexible or articulated element or chain portion which is retractable into the member to a substantially out-of-the-way position, or which may protrude from the outer end of the member to serve as a closing portion when connected with the coupling, and to provide a desired degree of flexibility or universal articulation between the threading member and the coupling member.

According to one aspect I provide upon the key chain a key threading or stringing member in the form of a jacket surrounding a desired portion of the key holding portion of the chain. The chain and the jacket are movable relative to one another in such a manner as to cause a terminal chain portion to emerge from the jacket to serve as a closing means for the key holding loop, or to be retracted into the jacket and into an out-of-the-way position when the threading member is being used as such.

According to another aspect I embody in the chain a hollow threading or stringing member and provide it with articulated closure means or chain portion which is retained by although movable or slidable within, and retractable to an out-of-the-way position into the hollow of the threading member when the threading member is being used as such in stringing the keys onto the chain, although such closure means may extend or protrude exposed from the outer open end or mouth portion of the threading member when the loop is closed.

For a practical embodiment of my invention in the attainment of further objects I utilize so-called bead chain which consists of hollow beads alternating with and interconnected by stems, the stems having universal joint or articulated connections with the beads. I also utilize bead chain splicer couplings in a special manner. Such a coupling consists of a short tubular member or shell having each end constricted to form a socket into which a terminal bead can be inserted or snapped by way of a lateral opening.

According to one feature I surround or enclose a suitable portion of the chain with a tubular jacket in such a manner that the inner end of the jacket is substantially fixed at an intermediate point of the chain, while a short non-enclosed end portion of the chain or closing portion may issue from the outer open end of the jacket for use in closing the key holding loop. This chain portion may be caused or allowed to collapse and thereby retract into the jacket to be out of the way while the threading member is being used in the stringing of the keys.

According to another feature I surround a suitable portion of the chain with a tubular jacket to be movable relative to the enclosed chain portion so that a short non-enclosed terminal portion of the chain may be allowed to extend from the outer end of the jacket for use in closing the key-holding loop, or may be retracted into the jacket while the same is functioning as a key threading member.

According to still another feature I provide at one end of the key holding chain a tubular key-threading member open at its outer end. Movable or slidable within, yet retained by this member there is provided a flexible closure element or short chain portion, so that it may be substantially out-of-the-way or withdrawn into the key threading member when serving as a means for closing the chain.

According to other features I provide a single length of bead chain and by the use of adjustable branch couplings form an adjustable loop at each end of the chain, the one loop to constitute an anchoring or fastening portion, the other loop to constitute the key holding portion or loop of the chain, and I include in the key holding portion a key threading or stringing member.

More specifically, to form the loops, I use branch couplings which are in the nature of a two-socketed bead chain splicer coupling with the addition of an extra lateral opening opposite the main lateral opening.

Other features relate to the key holding portion or loop per se.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of other possible embodiments, and the invention is not to be limited thereto.

The novel features considered characteristic of my invention are set forth with particularity in the appended claims. The invention itself, however, both as to its organization and its method of operation, together with additional objects and advantage thereof, will be best understood from the following description of a specific embodiment when read in connection with the accompanying drawings in which:

Fig. 1 shows the key chain with keys assembled and the loop portions closed.

Fig. 1a is a partial side view along the line 1a—1a of the Fig. 1 assembly.

Fig. 2 shows the key holding loop portion open and illustrates the manipulation of the key threading member.

Fig. 3 is an enlarged detail view of the branch coupling with corresponding associated branch portions of bead chain, and shows an extra splicer coupling rendering the anchoring chain portion disconnectible from the key holding loop portion.

Fig. 4 is a view on the line 4—4 of Fig. 3.

Fig. 5 is a view on the line 5—5 of Fig. 3.

Fig. 6 shows a somewhat enlarged longitudinal section through the threading member from the mouth of which hangs a short terminal portion of the chain exposed.

Fig. 7 shows the threading member with its mouth pointing upwardly and the terminal chain portion collapsed into the threading member.

Fig. 6a is an enlarged detail sectional view showing a pair of beads of the chain interconnected and spaced from each other by a stem.

Fig. 7a is a similar detail view of a pair of beads illustrating the collapsed condition thereof with a major portion of the stem extending within one of the beads.

Fig. 8 illustrates the adjustability of the branch coupling upon the chain.

Fig. 8a shows the key holding loop having a relatively larger stop bead embodied therein.

The embodiment herein illustrated comprises a length of bead chain 10 consisting of hollow metal beads 11 and stems 12 in alternation, the total length of the chain being defined by the terminal beads 13 and 14 at the respective ends. The manner of articulated connection of the hollow beads with the stems appears from the enlarged sectional detail Figures 6a and 7a showing how the beads are swedged over the heads of the stems.

For the purpose of definition the total length of the chain may be considered as comprising different sections, namely an intermediate section $L_1$, and anchoring loop section or loop $L_2$ at one end, and a key holding loop section or loop $L_3$ at the other end of the intermediate section $L_1$.

The anchoring loop $L_2$ is formed by means of a bead chain splicer coupling $S_1$ having a socket $K_1$ at each end, and a main lateral opening $M_1$ through which a bead can be inserted into each respective socket, the coupling being rendered serviceable as a branch coupling by an extra lateral opening 16 opposite the main opening $M_1$. The chain is passed through the extra opening 16 in forming the loop $L_2$, a selected bead 17 of the chain is inserted or snapped into one end or socket of the coupling while the terminal bead 13 is snapped into the other end or socket of the coupling.

The key holding loop $L_3$ of the chain is shown to hold keys 18 strung thereon, this loop being larger than the loop $L_2$ but similarly formed by means of a bead chain splicer coupling $S_2$ having a socket $K_2$ at each end, a lateral main opening $M_2$, a lateral extra opening 19 opposite the main opening $M_2$. The loop $L_3$ is formed by allowing the chain to pass through the extra opening 19, while a selected bead 20 is allowed to engage in one socket, and the terminal bead 14 to engage in the other socket of the coupling $S_2$ (see also Figures 3, 4, 5).

The key holding loop $L_3$ comprises a key threading member 21 (see also Figures 6 and 7) in the form of a tubular jacket surrounding a series of beads 22 representing an end portion of the bead chain, the jacket having an inner constricted end 22a and an outer open end 22b. The outer end 22b represents an open mouth or mouth portion through which the chain is slidable, while the inner end 22a is constricted or swedged over the respective adjoining bead 22. This secures the jacket against axial displacement upon the chain, while allowing the chain end portion surrounded by the jacket to extend as in Fig. 6 and assume the extended length $E_1$, or to contract by collapsing upon itself to assume the length $E_2$ as in Fig. 7. In the Fig. 6 condition the mouth 22b of the jacket is turned downwardly or inverted so that from the mouth hangs exposed a short terminal chain portion of the length $E_4$ comprising by way of example the terminal bead 14 and one and one half adjoining beads 22. In the Fig. 7 condition the mouth 22b of the jacket is turned upwardly while the length $E_1$ is now shown to have contracted to the length $E_2$ into the jacket 21.

Since the branch couplings $S_1$ and $S_2$ can be placed upon any selected bead 11 of the chain, it is possible to adjust the size of each of the loops $L_2$ and $L_3$ as well as the effective total length of the chain to suit the user's convenience or requirements. The potential shifting of a branch coupling along the chain is illustrated in dot and dash lines in Fig. 8 showing the coupling disengaged from its engagement with an intermediate bead, although with the chain passing through the two lateral openings of the coupling and the coupling ready to be shifted relative to the chain in the direction of either arrows 23 or arrows 24 to have the now free socket K engaged upon a selected bead of the chain.

Since any strain or pull upon the loop $L_2$ and $L_3$ and upon the branch couplings $S_1$ and $S_2$ in the use of this chain will normally be exerted in the linear direction of the chain as indicated by arrows $R_1$ and $R_2$ in Fig. 1, there will exist no tendency to disengage the couplings.

Fig. 2 illustrates the function of the threading member 21 as such, showing the key holding loop open, the terminal bead 14 having been disengaged from the branch coupling $S_2$ and the terminal bead 14 along with its adjoining bead 22 having been retracted into the jacket or threading member due to the contraction or shortening of the respective enclosed end portion of the chain.

A user's left hand $H_1$ is shown to hold the threading member, while the right hand $H_2$ is shown to be placing the key 25 on the threading member 21. Thumb 26 in front and forefinger 27 in back of the threading member hold the upper portion of that member, while the third finger 28 in back and the fourth finger 29 in front hold the lower portion of the threading member. Conveniently the upper two fingers 26 and 27 momentarily releasing the upper portion of the threading member to allow the key to pass further down on the threading member, may then re-grasp the upper end portion of the member, while now the lower fingers 28 and 29 release the lower portion of the threading member so as to allow the key 25 to drop or slide down the open length $l$ of the key holding loop and onto keys 30 already strung up and resting upon the branch coupling $S_2$ now acting as a stop on the chain. Thereupon the key holding loop may be closed by turning the threading member or jacket 21 downwardly to allow the short terminal chain portion of the length $E_3$ to protrude or be exposed from the mouth of the jacket and then placing or snapping the terminal bead 14 through opening $M_2$ into its socket $K_2$ on branch coupling $S_2$.

The open length $l$ of the key holding end portion of the chain may be lengthened by shifting the coupling $S_2$ a distance $d$ upon the chain as indicated by the dot-and-dash position of the coupling in Fig. 2 whereby the open length of the loop is increased $l + d = l_0$.

By way of example in the Fig. 6 extended condition of the enclosed end portion of the chain the jacket or threading member 21 is of a length to surround eight and one half beads corresponding to the length $E_3$ while a terminal length $E_4$ including two and one half beads is exposed. In the Fig. 7 condition a length of chain corresponding to ten and one half beads is enclosed by the jacket due to shortening of the enclosed chain portion, while only a length $E_5$ of one half of a bead is exposed. For example, with No. 6 standard bead chain such as shown in the catalogue folder of the Bead Chain Company of Bridgeport, Conn., a jacket 21 about 1¼ inches long might be chosen.

The jacket may be in the nature of a length of tubing of suitable inside and outside diameter slipped over a desired portion of the chain and then having its inner end constricted or swedged, or it may be in the nature of a suitably shaped piece of sheet metal wrapped or shaped with the aid of suitable dies around the desired portion of the chain in such a manner or with such clearance around the chain as to allow the respective enclosed chain portion to lengthen or shorten in the manner illustrated in Figures 6 and 7. One end of such a sheet metal piece may have a crenelated or toothed edge to allow for and to facilitate the constricting of that end portion when the piece is formed into tube shape around the chain.

The manner in which the enclosed portion of the chain extends and contracts or lengthens and shortens according to Figures 6 and 7 is further illustrated in Figs. 6a and 7a respectively by the enlarged detail section of a pair of associated beads 32 and 33 interconnected by and swedged over the respective beads 34 and 35 of a stem 36. In Fig. 6a which corresponds to the extended or lengthened condition, the beads are spaced apart a distance $D$ whereby the body or middle portion of stem 36 is exposed, while in Fig. 7a corresponding to the contracted, collapsed or shortened condition of the chain, the beads are shown practically to touch each other, the stem disappearing or concealed or telescoped into one of the beads.

As for the provision and manner of use of the threading member 21, this invention need not be limited by the inclusion of the anchoring portion of the bead chain, as is illustrated by the modified embodiment in Fig. 3 showing an additional splicer coupling 37 by means of which the anchoring portion of the chain can be detached from the key holding portion $L_3$ proper which portion or loop may then serve as a key ring or key holder per se. While bead chain lends itself to a highly practical embodiment, this invention need not exclude inclusion of other chain or of chainlike elements.

In order to confine the keys to a portion of the key holding loop $L_3$, there may be embodied in this loop a relatively larger stop bead 31 at an intermediate point of the loop, as in Fig. 8a.

A trouser belt B indicated in dot-and-dash lines in Fig. 1 illustrates the manner of anchoring or fastening the key chain to a piece of the user's wearing apparel.

The conditions according to Fig. 6 and Fig. 7 are shown as an example, and it will be understood that the lengths $E_1$, $E_2$, $E_3$, $E_4$, $E_5$ are variable in a suitable manner, for example by lengthening or shortening the jacket and/or lengthening or shortening the actual or un-collapsed length of the chain portion surrounded by the jacket.

It will be noted that a terminal length of chain which is surrounded by the hollow threading member or jacket 21 is indicated as $E_6$ in Fig. 6 and as $E_7$ in Fig. 7, and represents a flexible linear terminal element retained within the threading member in such a manner that it is extendable and retractable with respect to the threading member.

It will thus be seen that one aspect of this invention relates to the key-holding portion or key-ring per se, while another aspect relates to the key-chain as a whole having a key-holding loop at one end and an anchoring loop at the other end.

It will also be understood that while the article of this invention is herein variously termed keyring as well as key-chain, its use need not be limited to the holding of keys, but that it may serve for holding other apertured articles.

I claim:

1. A key holder comprising a chain having a terminal member at one end and a coupling member at the other end connectible with said terminal member, and a longitudinal jacket surrounding a portion of the chain whereby a terminal portion of the chain including said terminal member may remain exposed, the surrounded chain portion and the jacket being movable relative to one another in a manner whereby the exposed terminal chain portion is at least partially retractable into said jacket when the jacket is used as a key threading member.

2. A key holder comprising a chain having a terminal member at one end and a coupling member at the other end connectible with said terminal member, and a longitudinal jacket surrounding a portion of the chain whereby a terminal portion of the chain including said terminal member at the outer end of the jacket may remain exposed, said jacket having its inner end substantially fixed at an intermediate point of the chain, the surrounded chain portion being collapsible into the jacket whereby at least a part of said exposed chain portion is retracted into the jacket when the jacket is used as a key threading member.

3. A key holder comprising a length of bead chain having a terminal member at one end and a coupling member at the other end connectible with said terminal member, a longitudinal jacket surrounding a portion of the chain whereby a terminal portion of the chain including said terminal member at the outer end of the jacket may remain exposed, said jacket having its inner end constricted and thereby being substantially fixed at an intermediate point of the chain, the surrounded chain portion being collapsible into the jacket whereby at least a part of said exposed chain portion is retracted into the jacket when the jacket is used as a key threading member.

4. A key holder comprising a length of chain having a coupling member at one end and having at its other end a key-threading member open at its outer end, and a closure chain portion having a terminal member adapted to be connected with said coupling member and retained within said threading member in a manner whereby it is adapted to be retracted into said threading member when that member is used as such, and to extend from said open end of the member when connected with said coupling member.

5. A holder for apertured articles comprising a chain, a longitudinal jacket surrounding a portion of the chain whereby a terminal portion of the chain may remain exposed, said jacket having its inner end substantially fixed at an intermediate point of the chain, the surrounded portion being collapsible into the jacket whereby said exposed chain portion is retractable into the jacket when the jacket is used as a threading member, removable stop means at the end of said exposed chain portion, and stop means at the other end of the chain.

6. A holder for apertured articles comprising a length of bead chain, a longitudinal jacket surrounding a portion of the chain whereby a terminal portion of the chain at the outer end of the jacket may remain exposed, said jacket having its inner end constricted and thereby being substantially fixed at an intermediate point of the chain, the surrounded chain portion being collapsible into the jacket whereby said exposed chain portion is retractable into the jacket when the jacket is used as a threading member, removable stop means at the end of said surrounded chain portion, and stop means at the other end of the chain.

7. A holder for apertured articles comprising a length of flexible linear element having at one end a hollow threading member, a flexible linear terminal element retained within said member in a manner whereby it is retractable into said member when used for threading, as well extendable from the outer open end of said member, removable stop means provided at the outer end of said terminal element, and stop means provided at the other end of said length of linear element.

8. A holder for apertured articles comprising a length of flexible linear element having at one end a hollow threading member open at its outer end, a terminal chain portion retained within said threading member in a manner whereby it is retractable into said member when used for threading, as well extendable from the outer end of the member, removable stop means provided at the outer end of said terminal chain portion, and stop means provided at the other end of said length of linear element.

9. A holder for apertured articles comprising a length of chain having at one end a threading member open at the outer end, a terminal chain portion retained within said threading member in a manner whereby it is retractable into said threading member when that member is used as such, and extendable from the outer open end of the member, removable stop means at the outer end of said terminal chain portion, and stop means at the other end of said length of the chain.

10. A holder for apertured articles comprising a length of chain having at one end a hollow threading member open at its outer end, a flexible linear terminal element retained within said threading member in a manner whereby it is retractable into said threading member when that member is used as such, and is extendable from the outer open end of that member, removable stop means provided at the outer end of said terminal element, and stop means provided at the other end of said length of chain.

THEODORE M. JABLON.

REFERENCES CITED

The following references are of record in the file of this patent:

UNITED STATES PATENTS

| Number | Name | Date |
|---|---|---|
| Re. 17,970 | Cook | Feb. 17, 1931 |
| 579,423 | Cleaveland | Mar. 23, 1897 |
| 674,775 | Knight | May 21, 1901 |
| 992,001 | King | May 9, 1911 |
| 1,104,009 | Seguin | July 21, 1914 |
| 1,423,230 | Urich | July 18, 1922 |
| 1,769,245 | Tregoning | July 1, 1930 |
| 2,086,468 | Bryan | July 6, 1937 |
| 2,117,137 | Blatz | May 10, 1938 |